United States Patent
She et al.

(10) Patent No.: US 12,181,170 B2
(45) Date of Patent: Dec. 31, 2024

(54) REDUNDANT POWER SUPPLY FOR HVAC SYSTEM INCLUDING REFRIGERANT LEAKAGE MITIGATION

(71) Applicant: Carrier Corporation, Palm Beach Gardens, FL (US)

(72) Inventors: Xu She, Cohoes, NY (US); HanJong Kim, Avon, CT (US); David Ginsberg, Granby, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 18/432,608

(22) Filed: Feb. 5, 2024

(65) Prior Publication Data

US 2024/0175600 A1 May 30, 2024

Related U.S. Application Data

(62) Division of application No. 17/082,101, filed on Oct. 28, 2020, now Pat. No. 11,933,516.

(Continued)

(51) Int. Cl.
| | |
|---|---|
| *F24F 11/88* | (2018.01) |
| *F24F 11/36* | (2018.01) |
| *F24F 11/38* | (2018.01) |
| *F24F 11/72* | (2018.01) |
| *H02M 7/217* | (2006.01) |
| *H02M 7/537* | (2006.01) |

(52) U.S. Cl.
CPC .............. *F24F 11/88* (2018.01); *F24F 11/36* (2018.01); *F24F 11/38* (2018.01); *F24F 11/72* (2018.01); *H02M 7/217* (2013.01); *H02M 7/537* (2013.01)

(58) Field of Classification Search
CPC .. F24F 11/72; F24F 11/38; F24F 11/36; F24F 11/88; H02M 7/537; H02M 7/217
See application file for complete search history.

(56) References Cited

U.S. PATENT DOCUMENTS

| | | |
|---|---|---|
| 2004/0085785 A1 | 5/2004 | Taimela |
| 2005/0162792 A1 | 7/2005 | Wang et al. |

(Continued)

FOREIGN PATENT DOCUMENTS

| | | |
|---|---|---|
| CN | 1708892 A | 12/2005 |
| CN | 101951012 A | 1/2011 |

(Continued)

OTHER PUBLICATIONS

European Search Report for Application No. 20203165.4 dated May 28, 2021.

(Continued)

*Primary Examiner* — Mohammad Ali
*Assistant Examiner* — Vincent W Chang
(74) *Attorney, Agent, or Firm* — Carlson, Gaskey & Olds, P.C.

(57) ABSTRACT

An exemplary heating ventilation and cooling (HVAC) system includes a multi-phase power input, an AC-DC rectifier connected to a DC-AC inverter via a DC power bus, a multi-phase power output connecting the DC-AC inverter to a fan blower motor, and at least one redundancy power system. The redundancy power system is configured to bypass at least one of the AC-DC rectifier and the DC-AC inverter.

16 Claims, 6 Drawing Sheets

Related U.S. Application Data

(60) Provisional application No. 62/931,336, filed on Nov. 6, 2019.

(56) References Cited

U.S. PATENT DOCUMENTS

| | | |
|---|---|---|
| 2008/0301476 A1 | 12/2008 | Itakura |
| 2009/0128084 A1 | 5/2009 | Johnson et al. |
| 2009/0256422 A1 | 10/2009 | Fox et al. |
| 2011/0018348 A1* | 1/2011 | Rockenfeller .......... H02J 9/062 307/66 |
| 2011/0025300 A1 | 2/2011 | Ahmed et al. |
| 2018/0262132 A1 | 9/2018 | Snipes et al. |
| 2020/0132321 A1 | 4/2020 | Blanton |
| 2021/0215413 A1* | 7/2021 | Deaville ................. F25B 49/02 |

FOREIGN PATENT DOCUMENTS

| | | |
|---|---|---|
| CN | 203119479 U | 8/2013 |
| EP | 0852425 | 7/1998 |

OTHER PUBLICATIONS

European Search Report for Application No. 20203165.4 dated Feb. 24, 2021.

\* cited by examiner

REDUNDANT POWER SUPPLY FOR HVAC SYSTEM INCLUDING REFRIGERANT LEAKAGE MITIGATION

CROSS-REFERENCE TO RELATED APPLICATION

This application is a divisional of U.S. Non-Provisional patent application Ser. No. 17/082,101, filed on Oct. 28, 2020. U.S. Non-Provisional patent application Ser. No. 17/082,101 claims priority to U.S. Provisional Application No. 62/931,336 filed on Nov. 6, 2019.

TECHNICAL FIELD

The present disclosure relates generally to power supplies for heating ventilation and cooling (HVAC) systems including refrigerant leakage mitigation systems, and specifically to a power supply including a redundant power source.

BACKGROUND

Heating ventilation and cooling systems, such as those utilized for residential environmental systems utilize refrigerants within the HVAC cooling systems to enhance the cooling provided. In some cases, such as with A2L type refrigerants, when a leak occurs it is important to disperse the refrigerant to prevent excessive concentrations of the refrigerant from occurring in a single location.

SUMMARY OF THE INVENTION

A heating ventilation and cooling (HVAC) system according to one example includes a multi-phase power input, an AC-DC rectifier connected to a DC-AC inverter via a DC power bus, a multi-phase power output connecting the DC-AC inverter to a fan blower motor, and at least one redundancy power system configured to bypass at least one of the AC-DC rectifier and the DC-AC inverter.

An HVAC system according to the previous example, wherein the at least one redundancy power system includes a plurality of bypass switches connecting the multi-phase power input to the multi-phase power output.

In another example HVAC system according to any of the previous examples, the plurality of bypass switches includes transistors, and wherein each of the transistors includes a control input.

In another example HVAC system according to any of the previous examples, each of the control inputs is electrically connected to one of a controller output and a sensor output such that the one of the controller output and the sensor output controls an open/closed state of each of the transistors.

In another example HVAC system according to any of the previous examples, the at least one redundancy power system includes an energy storage system connected to the DC bus.

In another example HVAC system according to any of the previous examples, the energy storage system includes at least one of a battery and a super capacitor.

In another example HVAC system according to any of the previous examples, the redundancy power system includes one of a backup AC-DC rectifier and a backup DC-AC inverter arranged in parallel with a corresponding one of the AC-DC rectifier and the DC-AC inverter.

In another example HVAC system according to any of the previous examples, the redundancy power system includes both the backup AC-DC rectifier and the backup DC-AC inverter arranged in parallel with the corresponding one of the AC-DC rectifier and the DC-AC inverter.

In another example HVAC system according to any of the previous examples, the at least one redundancy power system includes a second AC-DC rectifier connected to a second DC-AC inverter via a second DC bus, wherein the at least one redundancy power system is parallel to the AC-DC rectifier and the DC-AC inverter.

Another example HVAC system according to any of the previous examples, also includes a controller configured to activate the redundancy power system in response to a failure of at least one primary element.

Another example HVAC system according to any of the previous examples, also includes an air-conditioning unit containing the fan blower motor, the air conditioning unit including a controller configured to control operations of the HVAC system.

In another example HVAC system according to any of the previous examples, the controller includes instructions for responding to a refrigerant leak by activating a fan blower, maintaining power to the fan blower for a duration of the refrigerant leak, and activating the redundancy power system in response to a failure of at least one power system component.

In another example HVAC system according to any of the previous examples, the at least one redundancy power system includes a redundant input winding in the fan blower motor.

In one example, a method for operating an air conditioner includes detecting a refrigerant leak, activating a fan blower in response to detecting the refrigerant leak, and maintaining power to the fan blower for a duration of the refrigerant leak, and activating a redundancy power supply system in response to a failure of at least one component in an air conditioner power supply.

In another example of the above method, activating the redundancy power supply includes activating a plurality of bypass switches, thereby directly connecting a power grid to a fan blower motor power input.

In another example of any of the above methods, activating the redundancy power supply system includes connecting an energy storage component to a DC bus in response to a power grid ceasing providing power.

In another example of any of the above methods, activating the redundancy power supply system includes bypassing one of a disabled AC-DC rectifier and a disabled DC-AC inverter using a corresponding backup AC-DC rectifier and a corresponding backup DC-AC inverter.

In another example of any of the above methods, activating the redundancy power supply system includes bypassing both of a disabled AC-DC rectifier and a disabled DC-AC inverter using a corresponding backup AC-DC rectifier and a corresponding backup DC-AC inverter.

In another example of any of the above methods, activating the redundancy power supply system includes switching out a base power supply system and switching in a functionally identical backup power supply system.

In another example of any of the above methods, activating the redundancy power supply system in response to the failure of at least one component in the air conditioner power supply includes connecting the air conditioner power supply to a redundant input winding of a motor in the fan blower.

These and other features of the present invention can be best understood from the following specification and drawings, the following of which is a brief description.

DETAILED DESCRIPTION

Figure 1:
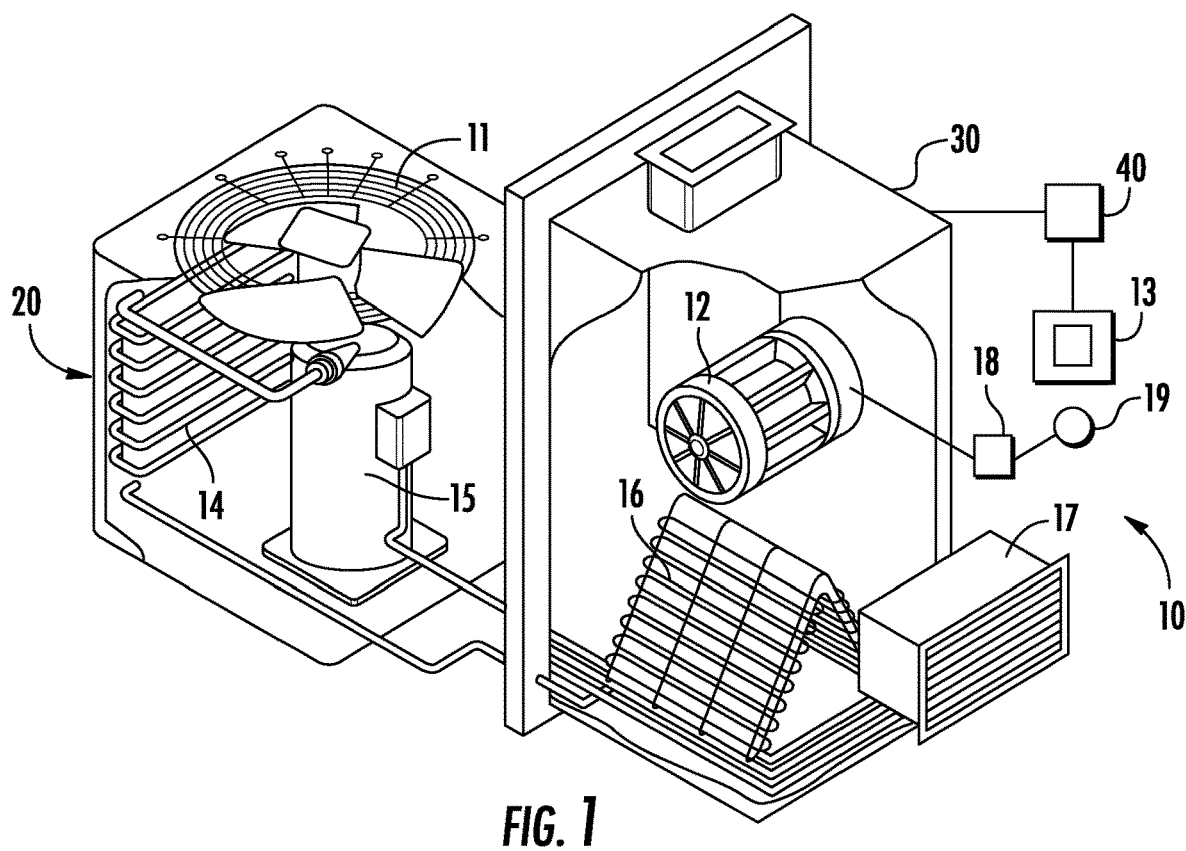
FIG. 1 illustrates an exemplary air conditioning unit for a heating ventilation and cooling (HVAC) system.

FIG. 1 schematically illustrates an exemplary HVAC system 10, including an external unit 20 and an internal unit 30. The external unit 20 includes a fan 11, a compressor 15 and a condenser 16. The compressor 15 drives refrigerant from an evaporator 16 in the interior unit 30 to the condenser 14. The fan 11 blows air over a condenser 14, and removes heat from refrigerant passing through the condenser 14. This allows the condenser 14 to release heat collected from the indoor air to an external environment.

The internal unit 30 includes a fan blower 12 that circulates indoor air over an evaporator 16. The air is passed through a filter 17 and is either expelled into the immediately adjacent interior environment, or distributed through the building via a network of ducts. The evaporator removes humidity from the indoor air and cools the air as it is passed over the evaporator 16. The fan blower 12 is powered by a power supply 18 which is connected to a power grid via any conventional power grid connection 19. In typical examples, the power grid connection 19 is a three-phase connection, but other numbers of phases can be utilized to similar effect. A thermostat 13 measures an interior temperature and/or humidity, and provides the measurement to a controller 40. The controller 40 controls the operations of the HVAC system 10 based on the outputs of the thermostat 13 as well as any internal sensor measurements.

In some examples, the particular refrigerant within the coils of the evaporator 16 and the condenser 14 can be flammable or otherwise hazardous in large local concentrations. In such systems, the HVAC system 10 can include internal sensors and the controller 40 is configured to detect when a refrigerant leak occurs in the evaporator coils 16 or in the condenser 14. In one such example, the controller 40 is configured to detect a large pressure drop and correlate the detected pressure drop with a refrigerant leakage. In alternative examples any other methodology or structure for detecting the presence of a refrigerant leak can be employed to similar effect.

Figure 2:
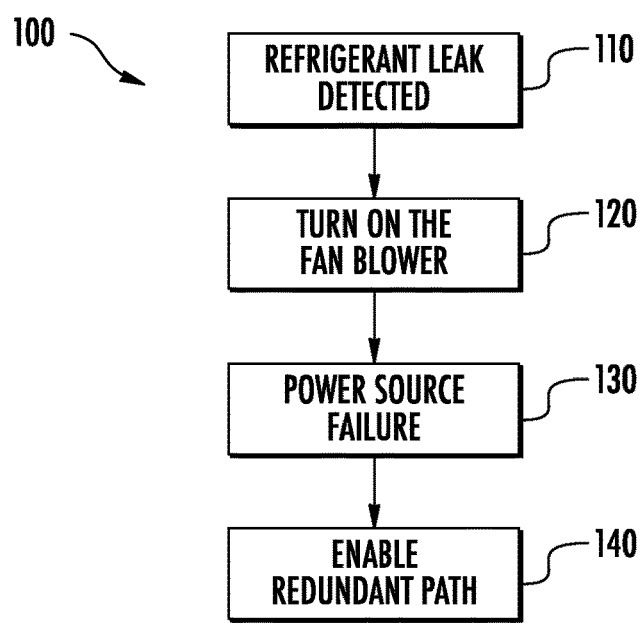
FIG. 2 schematically illustrates a procedure for dispersing leaked refrigerant from the exemplary air conditioning unit of FIG. 1.

With continued reference to FIG. 1, FIG. 2 schematically illustrates a process 100 for responding to the occurrence of a leak. Initially the controller 40 receives a signal indicative of the presence of the leak in a "Refrigerant Leak Detected" step 110. In order to prevent a localized concentration of the refrigerant from exceeding a desired level, the controller 40 initiates the fan blower 12, regardless of whether a thermostat 13 indicates that a temperature adjustment is required in a "Turn on the Fan Blower" step 120. Operation of the fan blower disperses the refrigerant throughout the environment, thereby preventing concentration of the refrigerant in any one location from exceeding a desired magnitude.

Due to the importance of maintaining a low concentration of the refrigerant during a leak, the fan blower 12 is maintained in an operating condition for the duration of the detection. In some instances, such as a power outage, or a failure of a component within the power source 18, the controller 40 will detect the power source 18 failure in a "Power Source Failure" step 130, and respond by enabling a redundant power system in an "Enable Redundant Path" step 140. The specific redundant path that is enabled will depend on the particular power source implementation of a given HVAC system and the underlying cause of the power failure. However, in each case the redundant path enables continued operation of the fan blower 12 for the duration of the detection by ensuring continued power flow to the fan blower 12.

Figure 3:
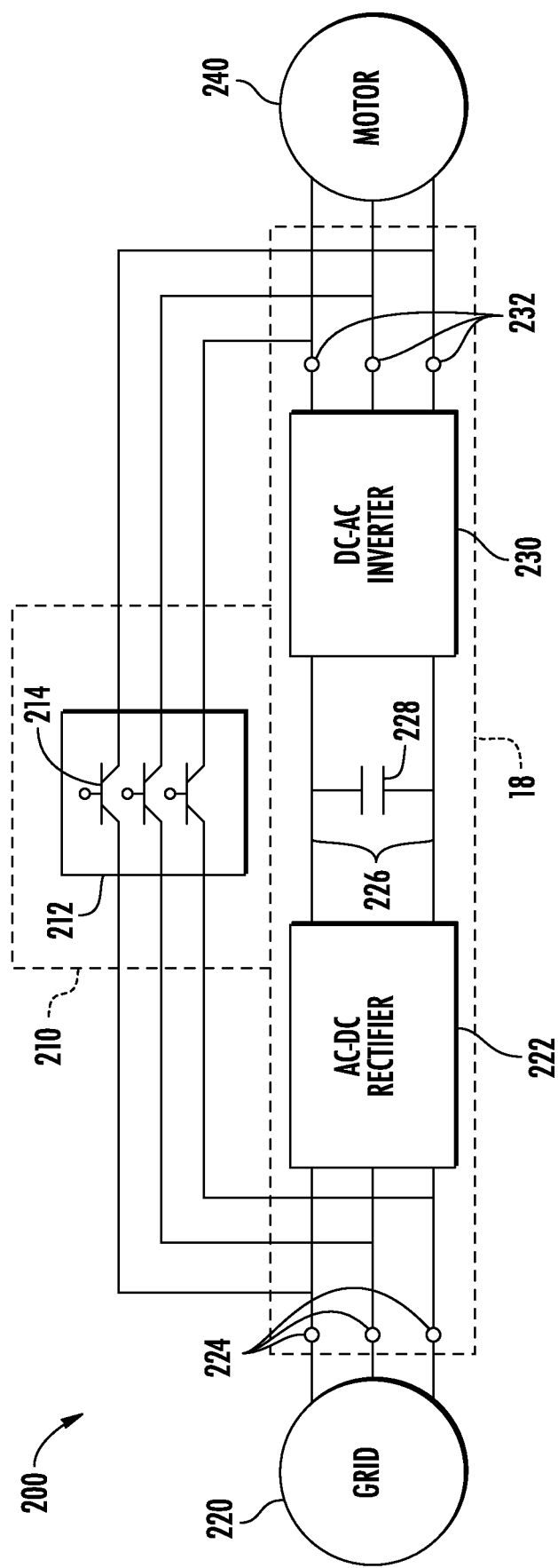
FIG. 3 schematically illustrates a first example power system including a redundant power supply for providing power to the HVAC system of FIG. 1.

With continued reference to FIGS. 1 and 2, FIG. 3 schematically illustrates a first exemplary power source 200 with a first redundancy power system 210. The base power supply 18 includes an AC-DC rectifier 222 connected to a power grid 220 via a multi-phase input 224. The AC-DC rectifier 222 outputs a DC power to a DC power bus 226. The DC power is filtered via a capacitor filter 228 and is provided to a DC-AC inverter 230 which converts the power back into a multi-phase power. The multi-phase power output from the DC-AC inverter 230 is provided to a motor 240 within the fan blower 12 via a set of multi-phase outputs 232. During conventional operations, the speed of the blower motor 240, and thus the provision of air across the coils in the HVAC system 10, is controlled via the switching within the AC-DC rectifier and the DC-AC inverter.

In the event of a failure within the base power supply 18, the redundancy system 210 is enabled by the controller 40 and bypasses the primary power supply 18 entirely. In the example of FIG. 3, the redundancy system 210 includes a bypass switch system 212 that is closed when a failure is detected. By closing the bypass switch system 212, the multi-phase input 224 and the multi-phase output 232 are directly electrically connected, and power is allowed to flow from the grid 220 directly to the motor 240. This direct connection causes the fan blower 12 to continue operating, despite a loss of the controls provided by the AC-DC rectifier 222 and the DC-AC inverter 230.

In one example, the bypass switch system 212 includes a transistor 214 connecting each phase, with a control input of each transistor being connected to the controller 40 detecting the refrigerant leakage. In another example, each transistor 214 can be directly connected to sensor outputs with the sensor outputs being configured to activate the corresponding transistor 214.

Figure 4:
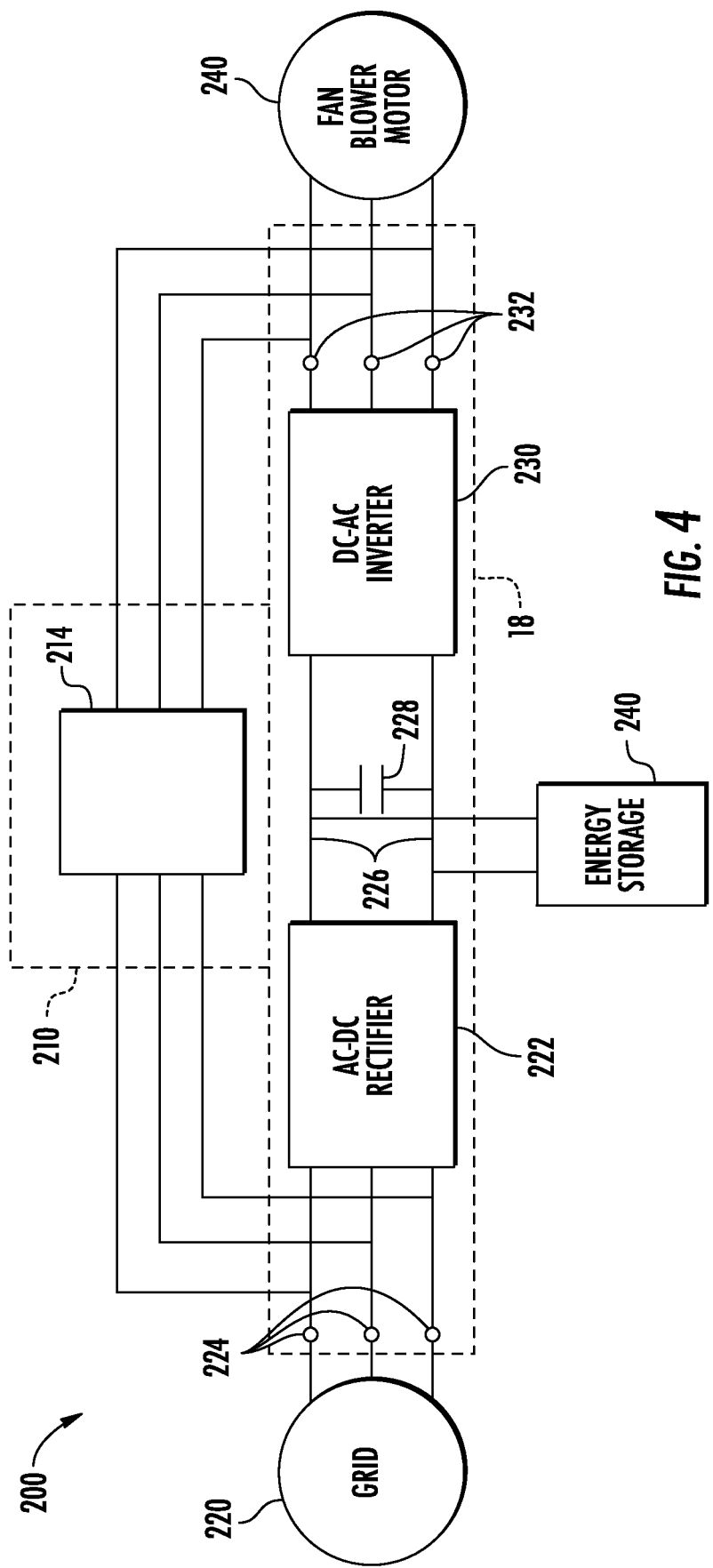
FIG. 4 schematically illustrates a second example power system including a redundant power supply for providing power to the HVAC system of FIG. 1.

With continued reference to FIG. 3, FIG. 4 schematically illustrates the system of power source 200 of FIG. 3, with the added feature of an energy storage component 242 included in the redundancy power systems. In the example of FIG. 4, the energy storage component is one of a battery and a super capacitor. In alternative examples, any other practical means for storing electrical energy could be utilized to similar effect. The energy storage component 242 is connected to the DC bus 226, and is configured to be able to provide power directly to the DC bus 226. In response to the controller 40 detecting that power is no longer being provided from the grid 220. The size of the energy storage component 242 is configured to sufficiently power the motor 240 for at least as long as the maximum time that a leak could persist. By way of example, if it is determined that the entirety of the refrigerant would leak out of the coil 16 in fifteen minutes, the energy storage component 242 is sized to provide sufficient power to operate the motor 240 for a minimum of fifteen minutes. The specific duration required can be determined theoretically or empirically depending on the configuration and size of any given system.

Figure 5:
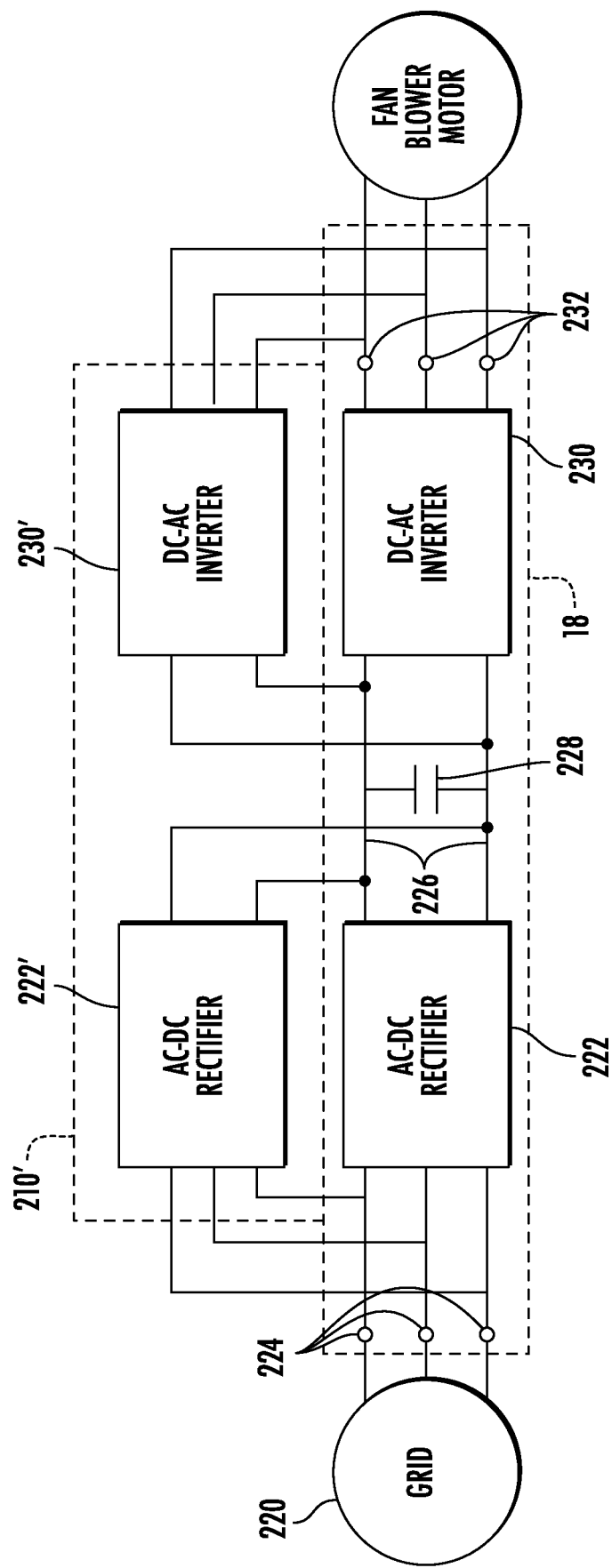
FIG. 5 schematically illustrates a third example power system including a redundant power supply for providing power to the HVAC system of FIG. 1.

With continued reference to FIGS. 1-4, FIG. 5 schematically illustrates an alternate redundancy system 210' utilized in conjunction with the same base power supply 18. In the example of FIG. 5, the power supply 200 includes a redundant AC-DC rectifier 222' and DC-AC inverter 230', with each of the redundant components 222', 230' being connected in parallel to the primary system 222, 230. The controller 40 is configured to monitor the status of the AC-DC rectifier 222 and the DC-AC inverter 230, and to activate the secondary component 222', 230' in response to detecting that the primary component 222, 230 has entered a failed state.

Figure 6:
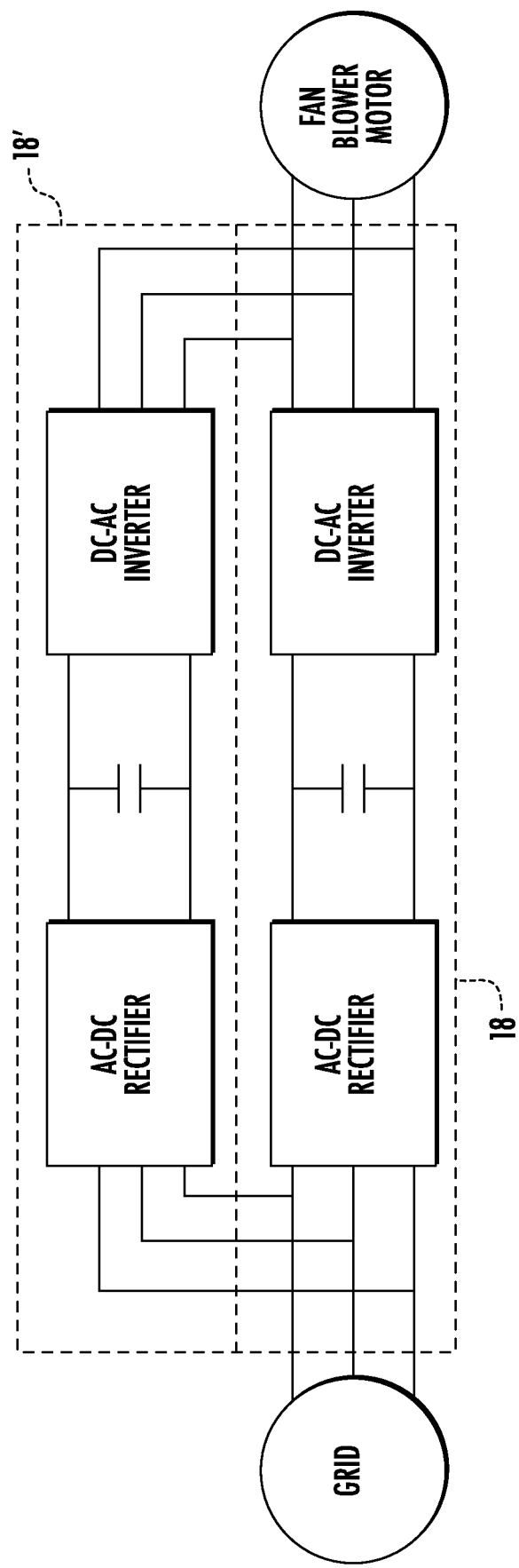
FIG. 6 schematically illustrates a fourth example power system including a redundant power supply for providing power to the HVAC system of FIG. 1.
Figure 7:
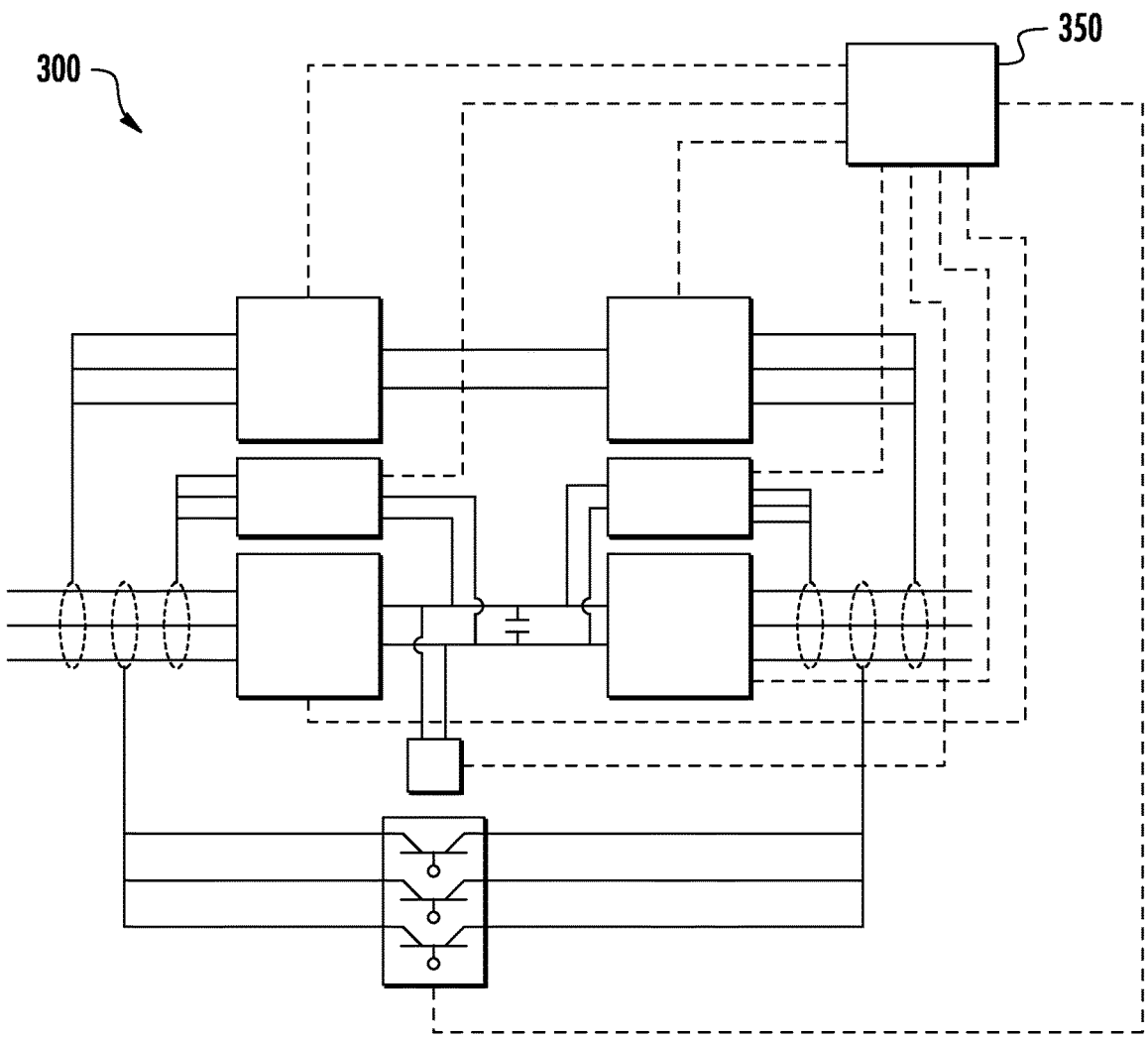
FIG. 7 schematically illustrates a sixth example power system incorporating all of the redundancy examples of FIGS. 3-6 in a single example.

With continued reference to FIGS. 1-5, FIG. 6 schematically illustrates another alternate redundancy system including the base power supply 18, and a parallel secondary power supply 18' operating as the redundancy system 210. The parallel secondary power supply 18' is functionally identical to the base power supply 18. In the example of FIG. 6, the redundancy system 210 can be switched on by the controller in response to any indication that the base power supply 18 is not capable of providing power.

With continued reference to FIGS. 2-6, FIG. 7 schematically illustrates an exemplary power source 300 incorporating all of the redundancy systems illustrated in FIGS. 3-6, and described above into a single embodiment, with a controller 350 controlling each of the components in the base power supply and the redundancy systems.

Figure 8:
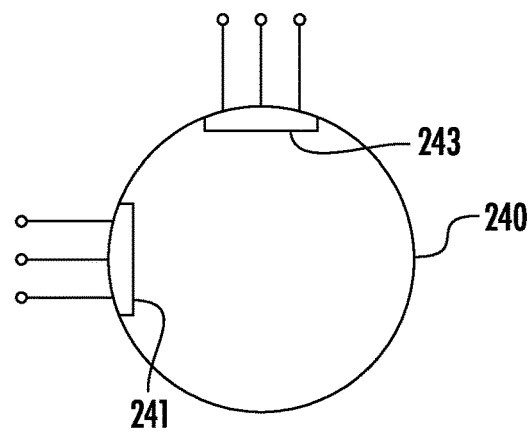
FIG. 8 schematically illustrates a fan blower motor for utilization in conjunction with any of the power systems of FIGS. 3-7.

In yet another example of any of the above described Figures, FIG. 8 illustrates an exemplary motor 240 including primary input windings 241 and redundant input windings 243. The motor 240 of FIG. 8 can be utilized in conjunction with any of the preceding power systems. In such an example, rather than connecting the backup systems to the multi-phase output 232, and providing the combined power to a fan blower motor 240 input winding 241, the backup systems can be connected to the redundant input windings 243, thereby allowing the fan blower motor 240 to continue operating when a failure occurs within the primary input windings 241. In yet other examples, a switching element, such as a transistor network, can be disposed between the combined multi-phase output of the power source and the primary input winding 241 and the secondary input winding 243. In such an example, the output of the power source can be switched from the primary input windings 241 to the redundant input winding 243 in the case of a failure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for operating a heating ventilation and cooling (HVAC) system comprising:
    detecting a refrigerant leak in an air-conditioning unit;
    activating a fan blower of the air-conditioning unit and maintaining the fan blower in a continuous operating state in response to detecting the refrigerant leak;
    detecting a failure in a power source;
    activating at least one redundancy power system in response to detecting both the failure in the power source and the refrigerant leak;
    wherein the power source includes:
    a multi-phase power input;
    an AC-DC rectifier connected to a DC-AC inverter via a DC bus;
    a multi-phase-power output connecting the DC-AC inverter to a motor of the fan blower; and
    the at least one redundancy power system.

2. The method of claim 1, wherein:
    the at least one redundancy power system includes a plurality of bypass switches connecting the multi-phase power input to the multi-phase power output; and
    activating the at least one redundancy power system includes activating the plurality of bypass switches to directly connect a power grid to the motor of the fan blower.

3. The method of claim 2, wherein the plurality of bypass switches include transistors, the transistors each including a control input.

4. The method of claim 1, wherein:
    the redundancy power system includes an energy storage system; and
    activating the at least one redundancy power system includes connecting the energy storage system to the DC bus.

5. The method of claim 4, wherein the energy storage system comprises one of a battery and a super capacitor.

6. The method of claim 4, wherein the failure in the power source comprises a power grid ceasing to provide power.

7. The method of claim 4, wherein the energy storage system is sized to power the motor of the fan blower for a maximum leak time, the maximum leak time determined by the total amount of refrigerant in the air conditioning unit.

8. The method of claim 1, wherein:
    the redundancy power system comprises at least one of a backup AC-DC rectifier and a backup DC-AC inverter arranged in parallel with a corresponding one of the AC-DC rectifier and the DC-AC inverter; and
    activating the at least one redundancy power system includes bypassing at least one of the AC-DC rectifier and the DC-AC inverter using at least one of the backup AC-DC rectifier and the backup DC-AC inverter.

9. The method of claim 8, wherein the failure in the power source comprises a failure in at least one of the AC-DC rectifier and the DC-AC inverter.

10. The method of claim 8, wherein:
    the redundancy power system comprises both the backup AC-DC rectifier and the backup DC-AC inverter arranged in parallel with the corresponding one of the AC-DC rectifier and the DC-AC inverter; and
    activating the at least one redundancy power system includes bypassing both of the AC-DC rectifier and the DC-AC inverter using the backup AC-DC rectifier and the backup DC-AC inverter.

11. The method of claim 10, wherein both the backup AC-DC rectifier and the backup DC-AC inverter are connected to the DC bus.

12. The method of claim 1, wherein:
- the redundancy power system comprises a second AC-DC rectifier connected to a second DC-AC inverter via a second DC bus; and
- activating the at least one redundancy power system includes bypassing the AC-DC rectifier, the DC bus, and the DC-AC inverter, with the second AC-DC rectifier, the second DC bus, and the second DC-AC inverter.

13. The method of claim 1, wherein the power source includes a first redundancy power system and a second redundancy power system.

14. The method of claim 13, wherein:
- the first redundancy power system comprises a plurality of bypass switches connecting the multi-phase power input to the multi-phase power output; and
- the second redundancy power system comprises an energy storage system connected to the DC bus.

15. The method of claim 14, wherein activating the at least one redundancy power system comprises:
- activating the first redundancy power system if the failure in the power source is a failure of at least one of the AC-DC rectifier, the DC bus, and the DC-AC inverter; and
- activating the second redundancy power system if the failure in the power source comprises a power grid ceasing to provide power.

16. The method of claim 1, further comprising maintaining the fan blower in the continuous operating state for a duration of the refrigerant leak.

* * * * *